Patented Oct. 22, 1929

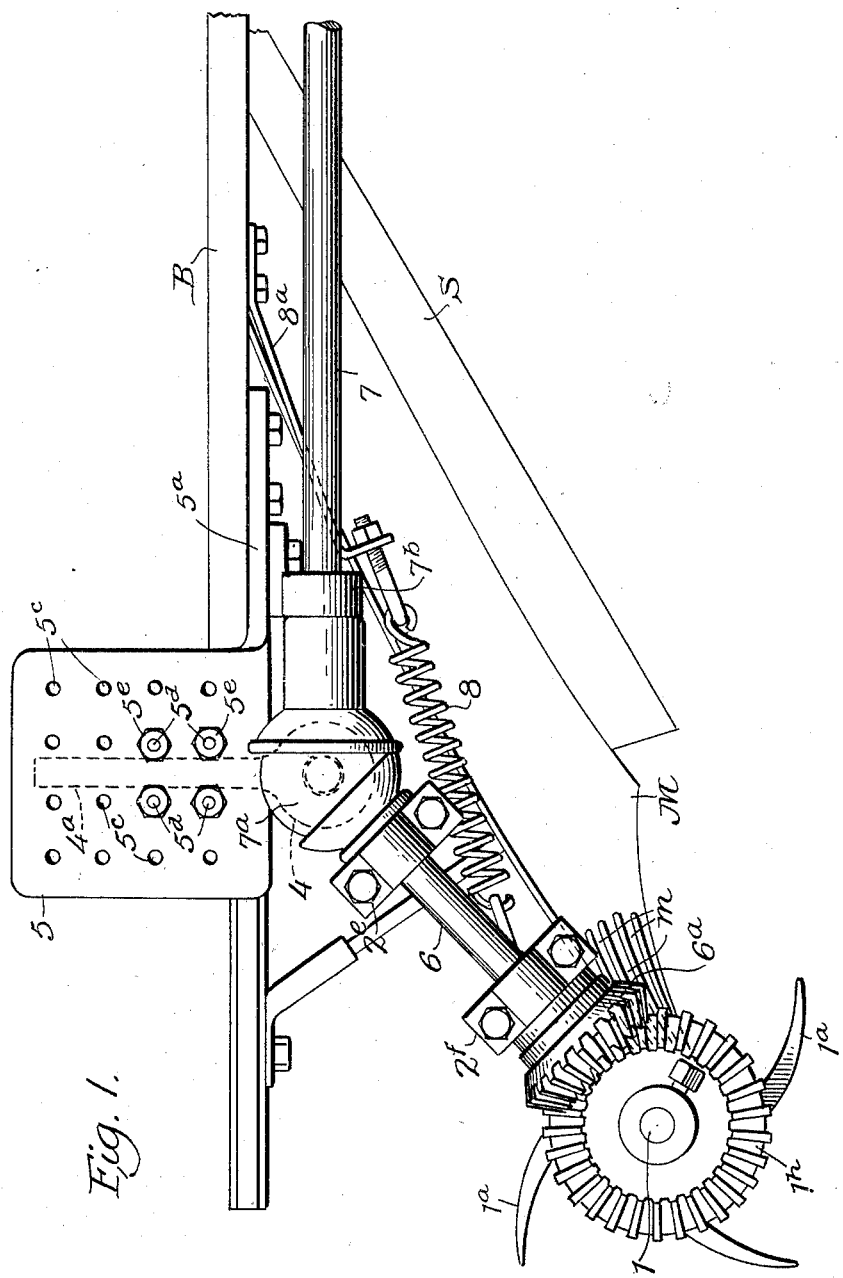

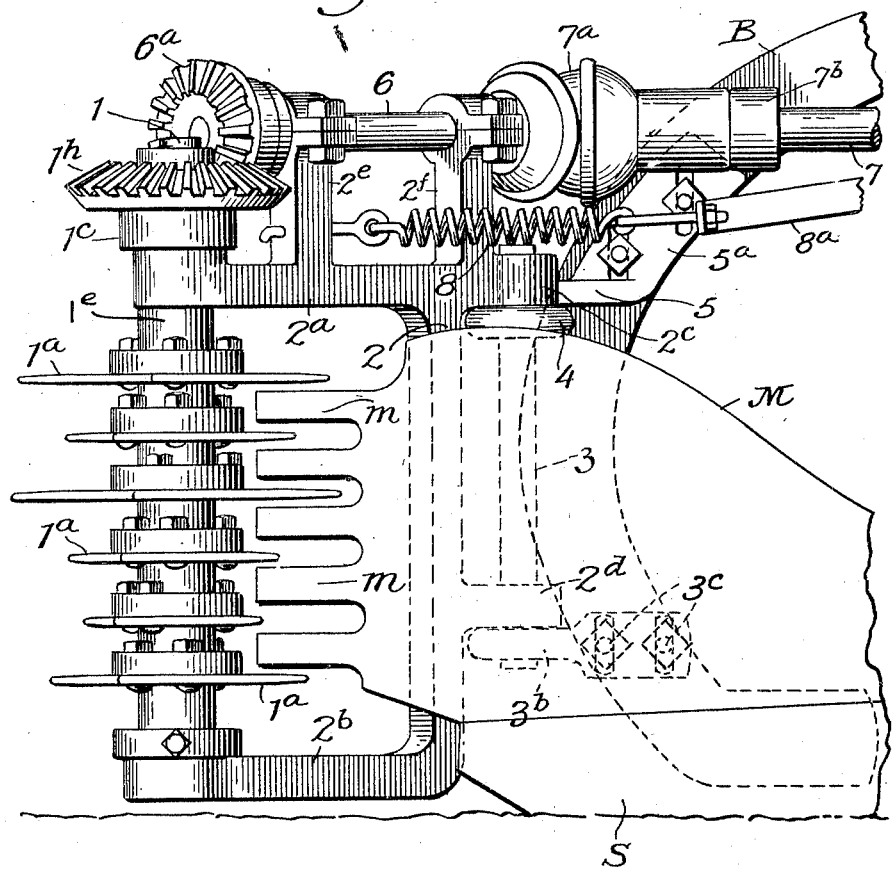

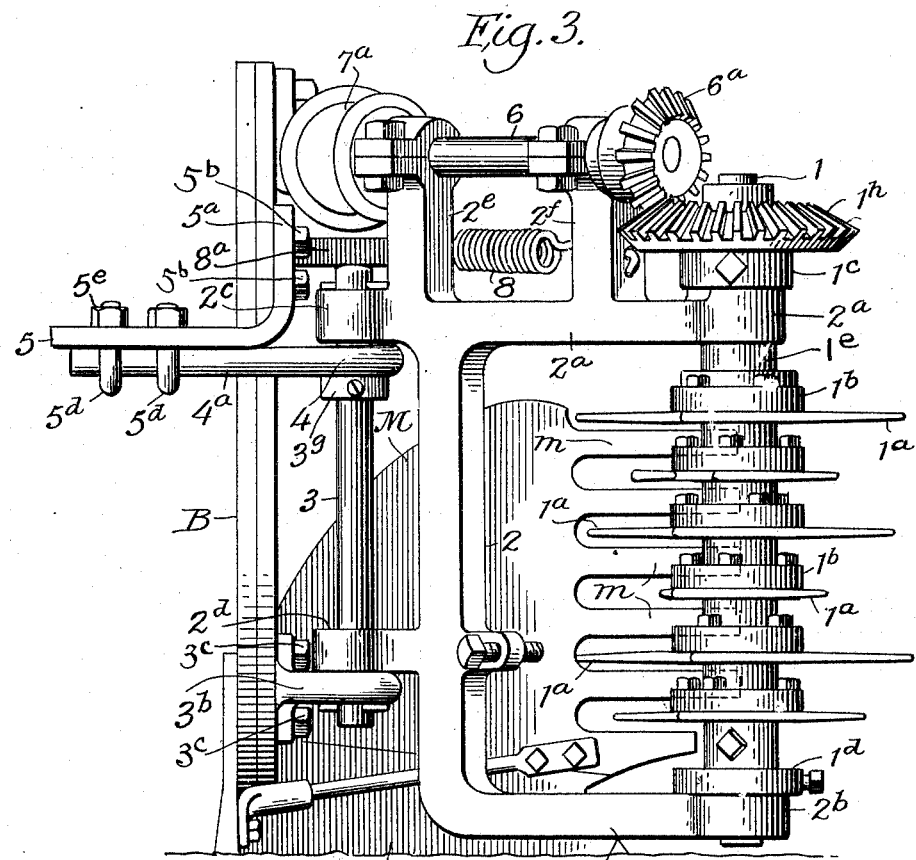
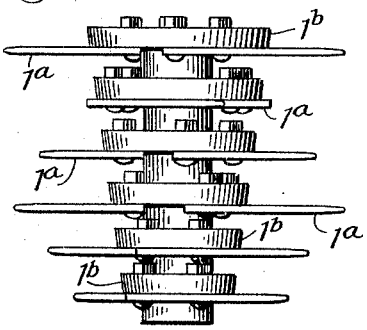
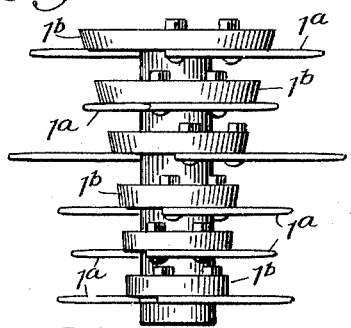

1,732,862

UNITED STATES PATENT OFFICE

DAVID E. ROSS AND WILLIAM AITKENHEAD, OF LA FAYETTE, INDIANA, ASSIGNORS TO TRUSTEES OF PURDUE UNIVERSITY, OF LA FAYETTE, INDIANA, A CORPORATION OF INDIANA

PLOW

Application filed February 11, 1926. Serial No. 87,553.

This invention is a novel improvement in plows, and its principal object is to provide a plow with novel attachments located at the land side of the mold board whereby the earth turned up by the plow is thoroughly disintegrated, or broken up and reduced to a condition suitable for planting. A further object of the invention is to so construct the attachment that the disintegrating cylinder can be adjusted at different angles to the mold board to vary the distribution of the earth.

In the accompanying drawings we have illustrated one practical embodiment of the invention and will explain the same with reference thereto to enable others to adopt and use it; but we do not consider the invention restricted to the particular construction illustrated in the drawings and therefore refer to the claims for summaries of the essentials of the invention and novel features of construction and novel combinations of parts for which protection is desired.

In said drawings—

Figure 1 is a plan view of the complete attachment and so much of the plow as is necessary to show the relation of the attachment to the plow.

Figure 2 is a side view of Figure 1.

Figure 3 is a rear view thereof.

Figures 4 and 5 are detail views illustrating modified forms of the disintegrating cylinder.

The plow to which the attachment is to be applied may be made of any suitable construction, but the invention is more particularly adapted for use with plows which are operated by tractors, or upon which a motor may be mounted to drive the disintegrating cylinder of the attachment. As the invention is adaptable to a great variety, makes and kinds of plows it is not necessary to show or describe the plow in detail herein. In the drawings we have shown only part of a well known kind of plow having the usual plow beam B, share S, and sufficient parts of a mold board M to enable it to cut and turn up a furrow in the usual manner only in the preferred form the mold board does not entirely turn over the furrow and we preferably use a partial mold board M in which the usual rear portion is omitted, so that the rear edge of such partial mold board will be approximately perpendicular to the bottom of the furrows as indicated in the drawings.

Just in rear of and at the land side of the mold board and cooperating therewith is what we term a disintegrating cylinder adapted to break up the soil turned up by the plow and throw the broken soil down at the furrow side of the plow in a finely divided condition. This disintegrating cylinder forms part of our novel attachment; which in the construction illustrated in the drawings is constructed as follows:

The disintegrating cylinder shown preferably comprises a shaft 1 which is suitably journaled in bearings in the upper and lower arms $2^a$, $2^b$ of a swingable frame or casting hereinafter described. Fixedly attached to the shaft 1 are a series of hubs or collars $1^b$, to which are attached radially disposed blades or teeth $1^a$, said teeth being preferably curved, as indicated, so as to have a kind of scythe-like action on the soil turned up by the plow. The shaft 1 may be provided with collars $1^c$, $1^d$, above its bearings in arms $2^a$, $2^b$, respectively, to support it on the swingable frame; and it may be provided with a collar $1^e$ under the upper bearing $2^a$ which coacts with the collar $1^c$ to prevent the disintegrator moving axially in its bearings.

The swinging frame carrying the disintegrating cylinder may be of any suitable construction. It is shown as an approximately U-shaped casting having a vertical portion 2 from which extend the arms $2^a$, $2^b$, in which the shaft 1 is journaled; and provided with rearwardly extending arms $2^c$, $2^d$, which are transfixed by a shaft bolt 3, which in turn is hingedly mounted upon and supported by an upper eyebolt 4 and a lower eye-bolt member $3^b$, which together support the swinging frame, and the disintegrating cylinder and operating parts mounted thereon. The lower member $3^b$ may be adjustably fastened to the lower portion of the foot of the beam B in any suitable manner. In the example shown the member $3^b$ is secured to the beam by means of bolts $3^c$ transfixing the member and the beam.

In the construction shown the eye-bolt or member 4 has its shank 4ª adjustably secured to a plate 5 which is rigidly attached to the beam B in any suitable manner. As shown the plate 5 has a lateral extension 5ª which is securely attached to the beam B by means of bolt 5ᵇ or any other suitable manner.

The shank of the eye-bolt or member 4 may be adjustably attached to plate 5 in any suitable manner. As shown the plate is provided with parallel series of perforations 5ᶜ which may be engaged by U-bolts 5ᵈ engaging the shank 4ª, and secured by nuts 5ᵉ; thus securely but adjustably attaching the eye-bolt 4 to the plate. This device enables the eye-bolt 4ª to be adjusted laterally and longitudinally thereby adjusting the swinging frame so that the disintegrating cylinder may be arranged at any desired angle to the mold board—for example, it can be set to lean toward the front or the rear of the beam; and may also be set to lean toward the furrow side or the land side of the plow; or both. The object of such adjustment will be hereinafter explained.

In the construction shown, the shaft 3 may be provided with a collar 3ᵍ under the member 4, to prevent the frame and distintegrating cylinder improperly lifting during the operation of the machine.

The disintegrating cylinder should be rotated when the machine is in operation. In the construction shown the shaft 1 has a bevel gear 1ʰ on its upper end, meshing with a pinion 6ª on a shaft 6, which may be journaled in bearings in uprights 2ᵉ, 2ᶠ, attached to or forming parts of the swinging frame. This shaft 6 preferably extends to a point approximately above and in line with the shaft 3, and at such point is connected by a universal joint 7ª, of any suitable construction, with a driving shaft 7, which shaft extends forward parallel with the beam B to a motor, not shown. Said shaft 7 may be driven directly or indirectly by the tractor (not shown) which pulls the plow; or by a motor (not shown) mounted on the plow beam, or frame to which the plow beam is attached. The particular means for driving the shaft 7 does not form part of the present invention; but preferably the shaft 7 should be driven by the motor or tractor that operates the plow. As shown the rear end of shaft 7 may be journaled in a bearing 7ᵇ which might be formed on or attached to the plate or casting 5, or be separately formed and secured to the beam B.

It is desirable to have the disintegrating cylinder mounted so as to be yieldable laterally; so that in case a rock or stump or other unyielding obstruction should be turned up by the plow or come in contact with the blades of the disintegrating cylinder, it could swing inwardly and pass the obstruction without breaking its teeth. For this purpose suitable spring means may be provided to hold the disintegrator yieldingly to its work. In the construction shown the disintegrating cylinder is normally held in operative position by means of a spring 8, one end of which may be attached to the arm 2ᵉ of the swinging frame, and its other end attached to one end of a rod 8ª the other end of which rod is attached to the beam B.

Preferably the mold board M is provided with rearwardly projecting spaced fingers m which project between the superposed spaced teeth 1ª of the disintegrating cylinder. Fingers m direct the soil on the mold board into position to be struck by the teeth of the disintegrating cylinder help to keep the teeth clear of trash which might otherwise accumulate therein.

In operation a plow equipped with an attachment such as described will turn a furrow in the usual manner, and as the earth reaches the rear end of the mold board the teeth of the disintegrating cylinder will break up and disintegrate the upturned strip of earth, pulverizing it, and preventing the formation of large clods or lumps of earth such as are produced by the ordinary plow; and the overturned earth is disintegrated and left in excellent condition, practically ready for planting without harrowing; although if desired the plowed earth may be further harrowed. The disintegrating cylinder being located at the land side and in rear of the mold board greatly assists the mold board in overturning the earth and at the same time pulverizes the earth more or less finely according to the number of teeth on the disintegrating cylinder, and according to the speed of rotation of such cylinder. Its speed can be readily controllable by properly proportioning the gearing, between the prime motor and the disintegrating cylinder.

With some soils it may be desirable to have the disintegrating cylinder operate in a vertical position. In other soils it may be desirable to have the disintegrating cylinder inclined toward the furrow side so that it will tend to throw down the broken earth. In other soils it may be desirable to have the disintegrating cylinder inclined toward the land side so as to throw the broken earth upwardly. The proper adjustment of the disintegrating cylinder to suit the nature of the soil being plowed can be readily made by adjusting the supports of the swinging frame as above explained.

In Figures 1, 2 and 3 the disintegrating cylinder is shown as approximately cylindric. In some cases it might be desirable to have the cylinder of other form; for example it might be made larger at bottom and smaller at top as indicated in Figure 5; or it might be made larger at top and smaller at bottom, as indicated in Figure 4; therefore we do not consider the invention restricted to any particular size construction or form of the disintegrating cylinder.

As stated the plow may have any desired means for opening a furrow and cutting and partially turning the soil. We preferably use a mold board such as shown and described, but we do not consider the invention restricted to the particular construction or arrangement or form of parts shown in the drawings, as the invention when once understood may readily be embodied in different forms, and the form construction and proportions of the parts could obviously be varied to suit the particular make or style of plow with which the attachment is to be used.

We claim—

1. In combination with a plow; a rotatable disintegrator located in rear of and at the land side of the mold board, a swingable frame carrying said disintegrator, a shaft mounted on said frame; gearing between the shaft and disintegrator, means for driving said shaft, spring means connected with said frame for yieldingly holding the disintegrator in operative position; and means for adjusting the frame to position the axis of the disintegrator at varying angles relative to the mold board.

2. In combination with a plow; a disintegrator located in rear of and at the land side of the mold board, a swingable frame carrying said disintegrator, a shaft mounted on said frame, gearing between the shaft and disintegrator; a driving shaft, and a universal drive connection between the said shafts.

3. In combination with a plow; a disintegrator located in rear of and at the land side of the mold board, a swingable frame carrying said disintegrator, a shaft mounted on said frame; gearing between the shaft and disintegrator, a driving shaft, a universal drive connection between said shafts; and spring means connected with said frame for yieldingly holding the disintegrator in operative position.

4. In combination with a plow; a disintegrator located in rear of and at the land side of the mold board, a swingable frame carrying said disintegrator, a shaft mounted on said frame; gearing between the shaft and disintegrator, a driving shaft, a universal drive connection between the said shafts, spring means connected with said frame for yieldingly holding the disintegrator in operative position; and means for adjusting the frame to position the axis of the disintegrator at varying angles relative to the mold board.

5. In combination with a plow; a rotatable disintegrator located in rear of and at the land side of the mold board, a swingable frame carrying said disintegrator, a shaft mounted on said frame, gearing between the shaft and disintegrator, a driving shaft, a universal drive connection between the said shafts, spring means connected with said frame for yieldingly holding the disintegrator in operative position, and means for adjusting the frame to position the axis of the disintegrator at varying angles relative to the mold board.

6. In a plow, means for opening a furrow, a rotatable disintegrator at the land side of the furrow opening means, means for rapidly rotating said disintegrator so that it will disintegrate and pulverize the strip of earth upturned by said means, means for yieldingly holding the disintegrator in operative position; and means whereby the angle of the axis of the disintegrator relative to the mold board can be adjusted.

7. In a plow, means for opening a furrow, a rotatable disintegrator at the land side of the furrow opening means, means for rapidly rotating said disintegrator so that it will disintegrate and pulverize the strip of earth upturned by said means, a swingable frame carrying said disintegrator, and means for adjusting the frame to vary the inclination of the axis of the disintegrator.

8. In combination with a plow having a mold board provided with rearwardly projecting fingers; a disintegrator located in rear of and at the land side of the mold board having radially projecting teeth adapted to coact with the fingers of the mold board, means for rapidly rotating said disintegrator so that it will disintegrate and pulverize the strip of earth upturned by said means, and means for yieldingly holding the disintegrator in operative position.

9. In combination with a plow having a mold board provided with rearwardly projecting fingers; a disintegrator located in rear of and at the land side of the mold board having radially projecting teeth adapted to coact with the fingers of the mold board, means for rapidly rotating said disintegrator so that it will disintegrate and pulverize the strip of earth upturned by said means, means for yieldingly holding the disintegrator in operative position, and means to adjust the axis of the disintegrator at varying angles relative to the mold board.

10. The combination with a plow of a swingable frame connected with the plow to swing in a substantially horizontal plane, a rotary disintegrator mounted in said swingable frame in a substantially upright position and so positioned that in operation it will engage the under surface of a furrow slice while the furrow slice is being turned over by the plow, and yielding means for holding the disintegrator against the furrow slice.

11. The combination with a plow of a swingable frame connected with the plow to swing in a substantially horizontal plane, a rotary disintegrator mounted in said swingable frame in a substantially upright position and so positioned that in operation it will engage the under surface of a furrow slice while the furrow slice is being turned over by the plow, yielding means for holding the disintegrator against the furrow slice, and motor driven means for imparting a rapid rotation to the disintegrator.

12. The combination with a plow of a swingable frame connected with the plow to swing in a substantially horizontal plane, a rotary disintegrator mounted in said swingable frame in a substantially upright position and so positioned that in operation it will engage the under surface of a furrow slice while the furrow slice is being turned over by the plow, yieldable means for holding the disintegrator against the furrow slice, and means for adjusting the frame to incline the axis of the disintegrator at various angles with relation to the moldboard.

13. The combination with a plow of a swingable frame, movable in substantially a horizontal position, with its lower end positioned within a furrow being made by the plow, a disintegrator shaft rotatively mounted in said frame, the swingable frame being provided with bearings for both the lower and upper ends of the disintegrator shaft, said swingable frame permitting the disintegrator to be positioned so that all of its disintegrator blades will penetrate the furrow slice to substantially the same extent.

14. In combination with a plow, a rotatable disintegrator in rear of and at the land side of the moldboard, means for rapidly rotating said disintegrator to disintegrate and pulverize the strip of earth upturned by said means, a swingable frame carrying said disintegrator, spring means connected with said frame for yieldingly holding the disintegrator in operative position, the means for driving the disintegrator including a shaft mounted on said frame, gearing between the shaft and disintegrator, and motor driven means for driving said shaft.

15. In combination with a plow, a rotatable disintegrator in rear of and at the land side of the mold board, means for rapidly rotating said disintegrator to disintegrate and pulverize the strip of earth upturned by said means, a swingable frame carrying said disintegrator, spring means connected with said frame for yieldingly holding the disintegrator in operative position, and means for adjusting the frame to incline the axis of the disintegrator at varying angles to the moldboard.

In testimony that we claim the foregoing as our own, we affix our signatures.

DAVID E. ROSS.
WILLIAM AITKENHEAD.